Feb. 28, 1967     K. F. ZIMMER     3,307,164
DEVICE FOR MEASURING AXIAL DISPLACEMENT OF A SHAFT
Filed May 29, 1961     3 Sheets-Sheet 1
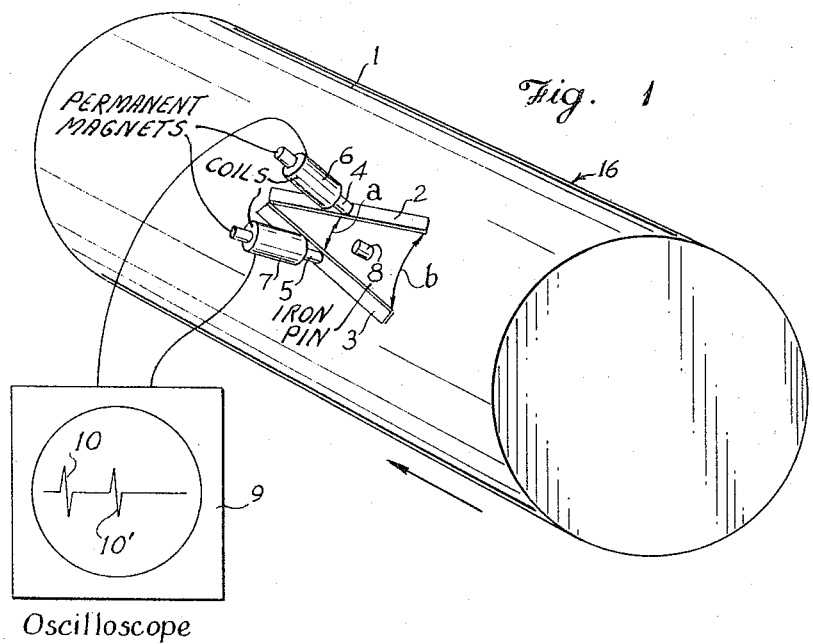
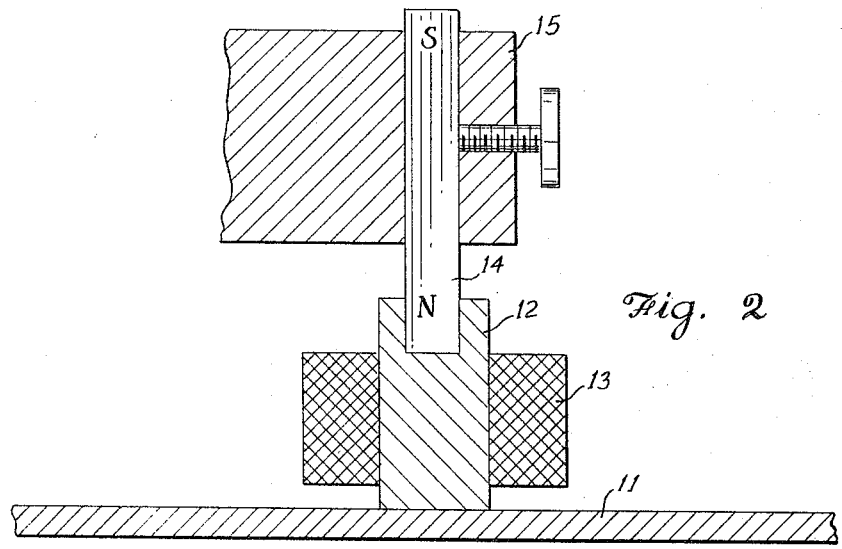

Feb. 28, 1967  K. F. ZIMMER  3,307,164
DEVICE FOR MEASURING AXIAL DISPLACEMENT OF A SHAFT
Filed May 29, 1961  3 Sheets-Sheet 2
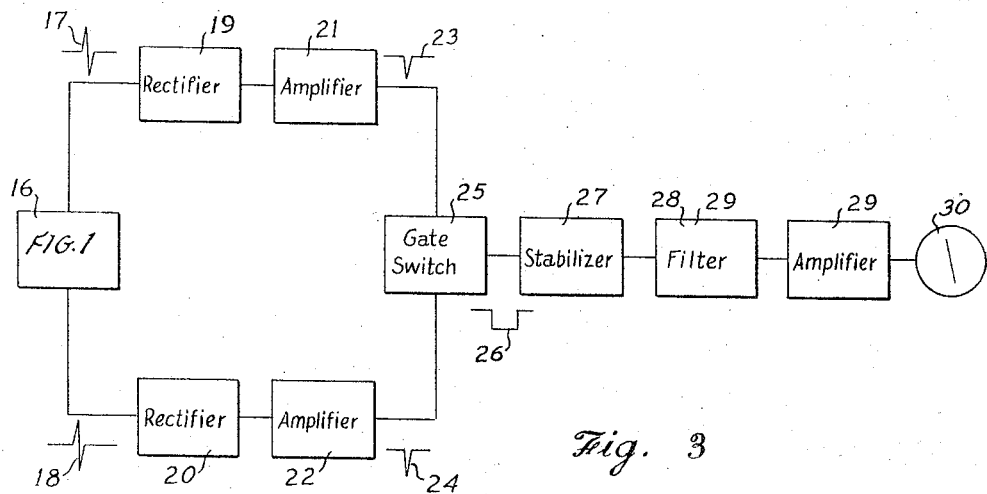
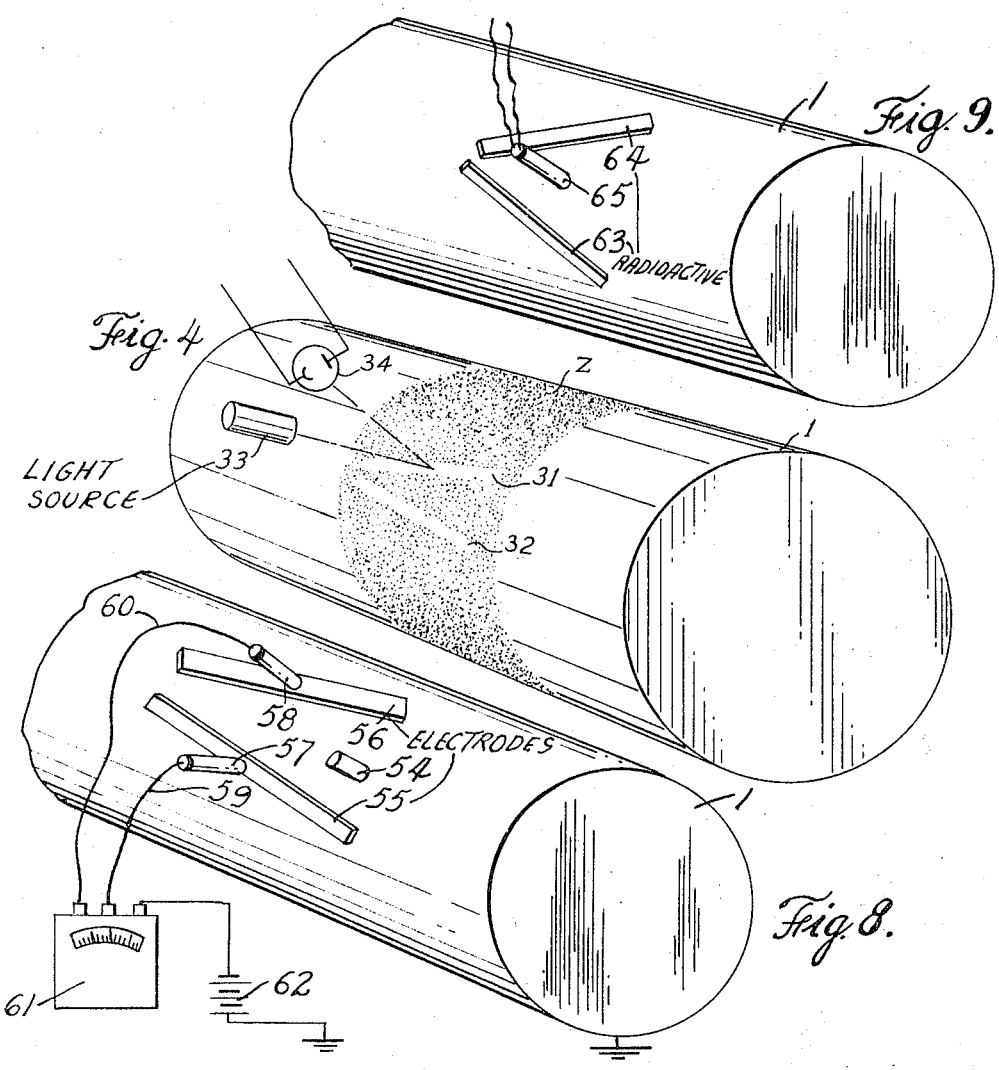

Feb. 28, 1967  K. F. ZIMMER  3,307,164
DEVICE FOR MEASURING AXIAL DISPLACEMENT OF A SHAFT
Filed May 29, 1961  3 Sheets-Sheet 3

United States Patent Office 3,307,164
Patented Feb. 28, 1967

3,307,164
DEVICE FOR MEASURING AXIAL DISPLACEMENT OF A SHAFT
Karl Friedrich Zimmer, Rossdorf, near Darmstadt, Germany, assignor to Dr. Reutlinger & Sohne, Darmstadt, Germany
Filed May 29, 1961, Ser. No. 113,357
Claims priority, application Germany, June 4, 1960, R 28,094; May 4, 1961, R 30,259
10 Claims. (Cl. 340—195)

The problem of measuring the axial of a shaft in the direction of the longitudinal axis thereof with respect to a fixed point is often met with in industry. This measurement is very important in the supervision of steam turbines especially during the starting process, because of variable heating of the housing and shaft which develops different heating expansions can easily cause contact between the blades of the rotors and stator. There is regularly considerable destruction as the result.

The invention is a device to measure the movement in the axial direction of a rotating shaft with respect to a fixed point. The device can easily be applied and used substantially universally without need for contacts and without danger from outside influences such as by stray magnetic fields which frequently occur around turbogenerators.

According to the invention there are provided two signal propagating members one of which is mounted fast on the shaft and which rotates near the second to produce initial signals by action in energy or force fields such as a light beam or an electrostatic or magnetic field. The second member often is really a set of two elongated members extending in the general direction of the shaft axis but approaching each other. By the relative movement of one of the signal propagating members past two converging edges of the other there are at least two measurable changes produced. The duration between these two changes depends on what zones of the converging edges are transversed by the other propagating members so that the duration between changes becomes a measure of zone transversed or the relative position in the axial direction of the member fast on the shaft with respect to the other propagating member.

In the accompanying drawing, by way of example, several of many possible embodiments of the invention, FIG. 1 is a schematic representation of the invention in elemental form.

FIG. 2 shows a part of one of the signal propagating members.

FIG. 3 is a block diagram of an electrical system used in connection with the propagating members.

FIG. 4 shows schematically another form of the invention employing optics.

FIGS. 8 and 9 show, respectively, two other forms of the invention.

Figure 5:
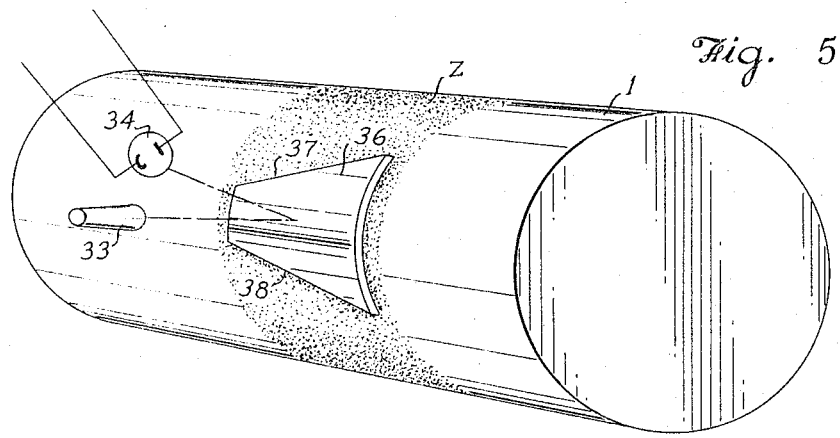
FIG. 5 shows an improved modification of the invention as shown in FIG. 4.

The invention is shown in FIG. 1 schematically. Movement in the direction of the axis of a shaft 1 is to be measured. At a slight distance from the surface of the shaft there are mounted two elongated pole pieces 2 and 3 of a magnet core, the pole pieces being formed as longitudinal flat iron bars running in the general direction of the shaft axis but somewhat converging. These bars are signal propagating members. On the two pole pieces are mounted perpendicular thereto, two barshaped permanent magnets 4 and 5 provided respectively with inductor windings 6 and 7. On the shaft is a small radial pin 8 of iron secured thereto, as by screw threads, which is the other or punctiform propagating member. This pin stands perpendicular to each pole piece in passing by it during rotation of the shaft and serves as an antipole. Passage of the iron pin 8 near the elongated pole pieces 2 and 3 alters the inductance in them and induces current pulses in the windings 6 and 7.

The time interval between these current pulses changes with the displacement of the pin 8 along the axis of the shaft. Thus if the shaft shifts in the direction shown by the arrow in FIG. 1 so that the pin passes a shorter arcuate distance $a$ between the bars than, say, out at $b$, the intervals between pulses will be shorter. The measuring of the intervals is made by an electron beam oscilloscope 9 to which the two windings 6 and 7 are connected serially.

During passage of the pin 8 past the two pole pieces 2 and 3 there are two oppositely directed current pulses for each, one by entry of the pin into the zone of the piece and the other as the pin leaves the zone, producing the double edge pulses 10 and 10'. The time intervals at corresponding phase points of these double-edge pulses is a measure of the axial movement of the pin and shaft, provided the speed of rotation is constant.

Speed of rotation can be very easily taken care of by suitable means so that the time scale of the oscilloscope is also undisturbed by the speed. This can be effected easily since the sweep frequency for the electron beam can be made dependent on the speed of the shaft, either by running contacts or by a generator mounted on the shaft. In the case of a turbogenerator to which the oscilloscope is connected electrically, the interval between the pulses is then an absolutely direct measurement of the axial movement of the shaft.

In FIG. 2 there is shown a practical embodiment of the stationary parts of one of the two magnetic circuits. The elongated pole piece is designated 11 and is mounted fast on the iron core 12 of the inductor coil 13. At its upper free end, the core is mounted fast on a permanent bar magnet 14 adjustably mounted in a clamping device 15. As is evident, this is a very robust construction which can easily be produced with ordinary tools, and the antipole pin 8 can easily be secured to the shaft. There is no disturbance by stray fields, since the generated impulse has a great amplitude and a stray field effect can be filtered out by high-pass filters. Likewise an alteration of the impulse amplitude, produced by changes in the magnets, coil short circuit or the like, does not influence the readings since the time interval between pulses is the sole measure.

The indication by an oscillograph is not suitable for control readings and a robust indicating instrument is more desirable, and under certain circumstances easily made recordings should be possible. This end is easily accomplished by means of a switching device in which constant current is fed to an indicator or recording instrument and the period of flow of the current to the instrument is controlled by the impulses induced by the two magnetic circuits and the average current input is indicated by the indicating instrument.

Such a switching device is shown diagrammatically in FIG. 3. The impulse producer is shown as 16 which is or is similar to that generally designated and described of FIG. 1 using the two magnetic circuits. In this case the two impulses are tapped separately, as for instance by a circuit for each inductor winding, the two pulses are respectively designated 17 and 18, the one following the other in time. In the two rectifiers 19 and 20, which may be half-wave rectifiers, the two reverse cycle impulses are left as is or are transformed to unidirectional pulses and then amplified in amplifiers 21 and 22, so that they then have the forms designated 23 and 24 and then pass to a transmission or switch gate 25 wherein one mplified pulse, say 23 opens the gate for a current flow and the other closes it. There is produced in this manner a unidirectional pulse 26 of breadth corresponding to the time interval between the two pulses 23 and 24. The amplitude of the output 26 from the gate is made constant by a ballast or stabilizer 27 such as a circuit containing constant current diode, and then any alternating voltage components remaining are eliminated by a low pass filter 28.

The resulting unidirectional pulse is amplified by a D.C. amplifier 29 and applied to an indicating instrument 30. The instrument 30 is so sluggish that it does not indicate instantaneous values but the average input from the pulses. The average value is dependent only on the durations of the impulses and on their frequency since their amplitude is kept constant. At a given zone of rotation of the antipole 8 the duration of the squared pulses is inversely proportional to the speed of rotation of the shaft, and the frequency directly proportional. Therefore the instrument 30 indicates the position of the antipole 8 with respect to the fixed pole pieces 2 and 3 independent of the speed of rotation of the shaft 1. Since an absolute zero reading is not producible by the two magnetic circuits, the instrument 30 may be zeroed by a biasing or suppressing current, say, ahead of the amplifier, and scale divisions on instrument 30 then chosen according to the gain of the amplifier 29, to mention only one method of calibration.

Instead of use of action by induction for the generation of the initial pulse, use of a capacitive action is also contemplated. In FIG. 8 the shaft 1 is provided with a radial conductive pin-like member 54, for rotation near conductor bars 55 and 56 but spaced therefrom and disposed in a manner similarly described of magnet bars 2 and 3 which may be likened unto non-parallel sides of a cylindrical trapezoid. Bars 55 and 56 are fixed in space, or on, say, the turbine housing so that longitudinal movement of the shaft 1 causes a change in the length of the arc traversed by the member 54 from one bar to the other during rotation of the shaft. Bars 55 and 56 are carried on conductor mounts 57 and 58 having leads 59 and 60 to a sensor 61. A battery 62 connected through the sensor to the shaft 1 and each of the bars 55 and 56 maintains a potential difference between the shaft and the bars. During rotation of the shaft as the member 54 passes one bar the capacity of the system changes and with an attendant impulse of current sensed by the sensor 61. When the pin member passes the other bar a similar impulse is produced. These impulses can be employed as initial inputs to the meter 30 in substantially the same manner as produced by magnetic induction.

A device using an optical instead of a magnetic system is shown in FIG. 4. On the shaft surface there are mounted two elongated mirrors 31 and 32 inclined toward each other and generally running in the direction of the shaft axis. A source of light 33 is directed in a beam toward the surface of the shaft so that the beam is reflected to a photo electric cell 34 which produces impulses of current at intervals according to the speed and axial position of the shaft as described in FIG. 1. Here again, the time interval between pulses is a measure of the axial position of the shaft. The mirrors may be integral with the shaft 1 and be produced in an especially simple manner by polishing the shaft so as to form narrow mirror-like stripes 31 and 32 on a dull zone Z, or by applying reflective paint color or the like to the shaft.

In place of the optical system using a light ray, another form of radiation may be used. The shaft is provided in FIG. 9 with strips 63 and 64 similar to strips 31 and 32 but of radioactive isotopic material which emits energy or particles so as to act on a photo electric cell 65 or similar device responsive to radiation so that as each radioactive strip passes under the cell a current pulse is produced.

A further modification of the invention is shown in FIG. 5 employing light modulation. Here the shaft 1 also has a rough or dull zone Z on which is mounted a different energy modifier in the form of generally triangular or trapezoidal curved mirror 36 having oblique edges 37 and 38 running inclined toward each other and the shaft axis. This form differs from that in FIG. 4 in that the mirror is continuous between the strips 31 and 32 of FIG. 4. This form is like that in FIG. 4 however in that the propagation member extends along on the surface of the shaft in the general direction of the axis thereof and that the edges 37 and 38 approach each other. Light from the source 33 is picked up by the mirror and reflected to the cell 34 and the duration of the pulse itself varies with the axial position of the shaft.

In the arrangement in FIG. 4 in which no large reflective surface is shown, but rather two reflective strips in the general direction of the shaft axis but approaching each other, the time interval between energy outputs are measured. This measurement is effected according to FIG. 3 by an indication of average output dependent on the time duration of a constant value intermittent current whose "off and on" are determined by nearly instantaneous flashes of light. In the arrangement in FIG. 5 there is no such flash, but there is a shining of the light on the photo cell while the mirror 36 turns through the beam, and a flow of current through the cell is produced throughout this phase. This current flow is similar to that produced in FIG. 3 by the gate 25 wherein the duration of a constant current is governed by the length of the switched in period. In FIG. 5 provision should be made, as by conventional current limiting devices such as constant current diodes, so that the amplitude of the output from the photo cell after amplification, if necessary, is held to a predetermined value, so that only an average value dependent on duration of flow is applied to the instrument such as that at 30, which average value is a measure of the axial position.

Figure 6:
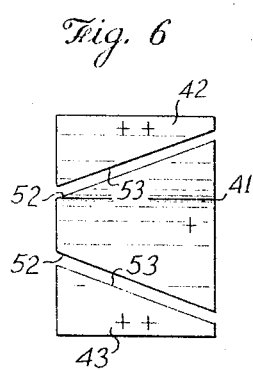
FIGS. 6 and 7 show another form of the invention.
Figure 7:
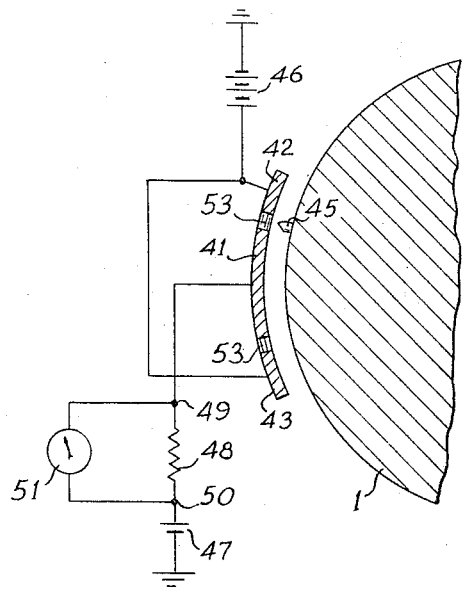

In FIGS. 6 and 7 there is shown an embodiment of the invention wherein the propagation members are conductive and a potential difference is applied to them. By a passage of the pin 45 past an inner curved plate 41 and outer plates 42 and 43 fixed near the path of the pin a current is produced by an alteration of charge distribution on the plates. As shown in FIG. 6, plate 41 has two outer edges 52 approaching each other as is shown for the mirror in FIG. 5 but plate 41 is spaced from the shaft. The plates 42 and 43 have, respectively, their two inner edges 53 spaced slightly from said edges 52, preferably at a uniform distance and parallel thereto and the combined area of plates 42 and 43 is about equal to that of plate 41.

A potential is applied to plates 42 and 43 by a uniform source 46 of relatively high potential 46 to produce a normally given charge with respect to the ground as indicated in the drawing by two positive signs. A source 47 of lower potential is applied to the plate 41 with like polarity but the charge with respect to ground is different as is designated with only one positive sign. By passage of the rotating conductive pin from the vicinity of one of the outer plates to near the inner plate there is a steep current rise which enables a remarkably easy measuring of the period during which the pin turns past the inner plate.

In FIG. 7 the pin 45 is shown directed toward and nearly just into the interspace between the plates 41 and 42. Since the plate 42 is at an appreciable higher potential due to the battery 46 than is the plate 41, at this position almost all field force lines run between the pin and the plate 42, and it can therefore not yet produce any appreciable influence on the plate 41. Yet the instant that the pin passes under the plate 41, the influence by the more highly charged plate 42 ceases and there arises a very sudden transition of lines of force from the pin 45 to the plate 41, that leads to a sudden altering of a capacitance condenser formed by the plate 41 and the shaft surface.

The charging of the plate 41 is accomplished by action of the battery 47 through the resistance 48. In an instant the capacity alteration between the plate 41 and shaft 1, which form a condenser, alters the voltage of plate 41 and then the voltage remains constant during the time the pin passes under the plate 41. This voltage change can be measured from taps 49 and 50 at the terminals of the resistance 48 on an instrument 51 indicating average values, which instrument is provided with an amplifier with a sufficiently high interval resistance so that the voltage distribution in the charging circuit for the plate 41 is not disturbed.

The invention claimed is:

1. A device for indicating the axial position of a rotating shaft with respect to a relatively stationary reference member which includes, a continuously rotation shaft, a reference member stationary relative to said shaft, an electrical signal generating means comprising first means on one of said rotating shaft and said reference member and second means on the other of said rotating shaft and said reference member, the means on said reference member being responsive to the relative movement of said other means adjacent thereto for generating said signal, one of said first and second means including a pair of converging means positioned so that planes normal to the axis of said shaft cut both of said converging means, said converging means controlling the generation of said signal, and means responsive to said generated signal for providing an indication of the position of said shaft axis relative to said reference member.

2. A device as claimed in claim 1, wherein said first means includes an iron containing pin member and each of said pair of converging means comprises a magnet and a coil thereon for interaction with said pin.

3. A device as claimed in claim 1, wherein said first means includes a pin of conductive material and each of said pair of converging means comprises a capacitor plate whereby said pin removes the charge of one of said pair of plates and then from the other of said pair of plates.

4. A device as claimed in claim 1, wherein said first mentioned means is a light responsive member and each of said pair of converging means comprises a light reflecting means.

5. A device as claimed in claim 1, wherein said means responsive to said generated signal comprises a gate switch means, means for opening and closing the gate switch means upon sensings of generated signals to produce pulses of current and a meter for indicating the average current of the pulses for indicating the longitudinal position of the shaft.

6. A device as claimed in claim 5, wherein said first means includes an iron containing pin member and each of said pair of converging means comprises a magnet and a coil thereon for interaction with said pin.

7. A device as claimed in claim 5, wherein said first means includes a pin of conductive material and each of said pair of converging means comprises a capacitor plate whereby said pin removes the charge of one of said pair of plates and then from the other of said pair of plates.

8. A device as claimed in claim 5, wherein said first mentioned means is a light responsive member and each of said pair of converging means comprises a light reflecting means.

9. A device for indicating longitudinal displacement of a continuously rotating shaft comprising two signal generating members, one of said members including a pair of converging means lying in the general direction of the axis of the shaft and the other being a pin and directed toward the first member for energy interaction therewith; one of the members being fast on the shaft to rotate therewith and the other stationary, means for energizing one of the members with respect to the other to produce an energy interaction through space between the two as one of the two rotates about the axis of the shaft in motion relative to the other so that when said converging means pass the vicinity of the other member there is a control of the interaction, and means for translating said interactions into an indication of the position of said shaft.

10. A device for indicating the longitudinal position of a rotating shaft comprising two elongated magnetic field producing members having inductor windings thereon and disposed beside each other stationary near the shaft and extending alongside the shaft but converging toward each other at their respective ends; an iron pin projecting from and fast on the shaft and into the fields of the members for inducing alternating single period pulses in the respective windings in sequence as the pin moves past the respective member; means for rectifying the alternating pulses at corresponding phases to unidirectional pulses, a gate switch means closed by the unidirectional pulses from one winding and opened by the other to produce a substantially constant amplitude square wave unidirectional pulse of duration equal to the time interval between corresponding phase positions of the two alternating pulses, and an average reading meter connected to the switch means to measure the average output of the square wave pulses so that readings will vary with the duration of the square waves and with the intervals between alike phases of the alternating pulse and of the time of passage of the pin from one member to the other, whereby the meter will indicate the relative position of the pin when traversing the members due to their being nearer together at one end than at the other.

References Cited by the Examiner

UNITED STATES PATENTS

| 2,068,116 | 1/1937 | Shotter | 340—196 |
| 2,078,796 | 4/1937 | Greentree et al. | 73—462 X |
| 2,167,488 | 7/1939 | Ohlson | 73—462 |
| 2,340,609 | 2/1944 | Mestas | 340—195 |
| 2,774,057 | 12/1956 | Jones | 340—195 |
| 2,882,516 | 4/1959 | Neergaard | 340—195 |
| 3,190,125 | 6/1965 | Holz | 340—200 |

NEIL C. READ, *Primary Examiner.*

WALTER STOLWEIN, THOMAS B. HABECKER, STEPHEN W. CAPELLI, *Examiners.*